United States Patent [19]
Richards

[11] 3,910,131
[45] Oct. 7, 1975

[54] TRANSMISSION WITH SNAP SHIFT

[75] Inventor: Elmer A. Richards, Oshtemo, Mich.

[73] Assignee: Eaton Corporation, Cleveland, Ohio

[22] Filed: Mar. 20, 1974

[21] Appl. No.: 452,727

[52] U.S. Cl.................... 74/331; 74/339; 192/67 R; 192/91 A; 192/109 B; 192/48.91
[51] Int. Cl.².. F16H 3/08; F16H 3/38; F16D 11/10; F16D 21/02
[58] Field of Search ............. 74/331, 339, 371, 372; 192/48.91, 67 R, 109 B, 91 A, 53 R, 53 B

[56] References Cited
UNITED STATES PATENTS

| | | | |
|---|---|---|---|
| 1,898,190 | 2/1933 | Kohler | 192/67 R |
| 3,349,635 | 10/1967 | Richards | 74/331 |
| 3,500,695 | 3/1970 | Keiser | 74/331 |

FOREIGN PATENTS OR APPLICATIONS

| | | | |
|---|---|---|---|
| 865,613 | 4/1961 | United Kingdom | 74/339 |
| 694,863 | 7/1940 | Germany | 74/339 |

*Primary Examiner*—Benjamin W. Wyche
*Attorney, Agent, or Firm*—Teagno & Toddy

[57] ABSTRACT

A shiftable change speed gear system, particularly a transmission, having resilient shifting mechanisms for simplifying the transmission structure and the shifting thereof. The transmission is preferably provided with multiple countershafts having countershaft gears thereon disposed in meshing engagement with main shaft gears encircling the transmission main shaft, which main shaft gears are axially immovable relative to the main shaft. The main shaft gears are nonrotatably connected to first clutch rings surrounding the main shaft, which clutch rings are axially movable relative to both the main shaft gears and the main shaft. The first clutch rings coact with second clutch rings which are nonrotatably secured to the main shaft. The cooperating pairs of clutch rings have resilient means associated therewith, whereby axial shifting of the cooperating clutch rings permits clutch engagement to be delayed until substantial speed synchronization between the clutch rings is achieved, whereupon the resilient means then causes relative axial movement between the cooperating clutch rings so that they meshingly engage one another to drivingly connect the respective main shaft gear to the main shaft.

21 Claims, 4 Drawing Figures

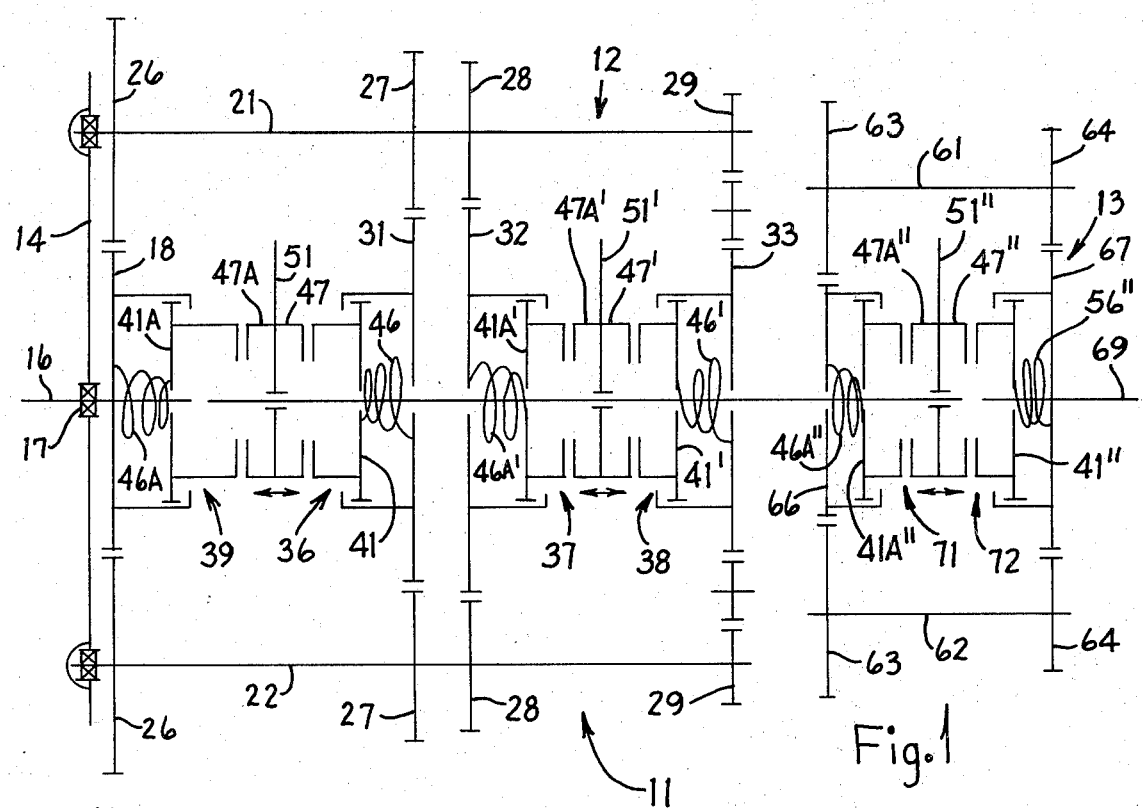
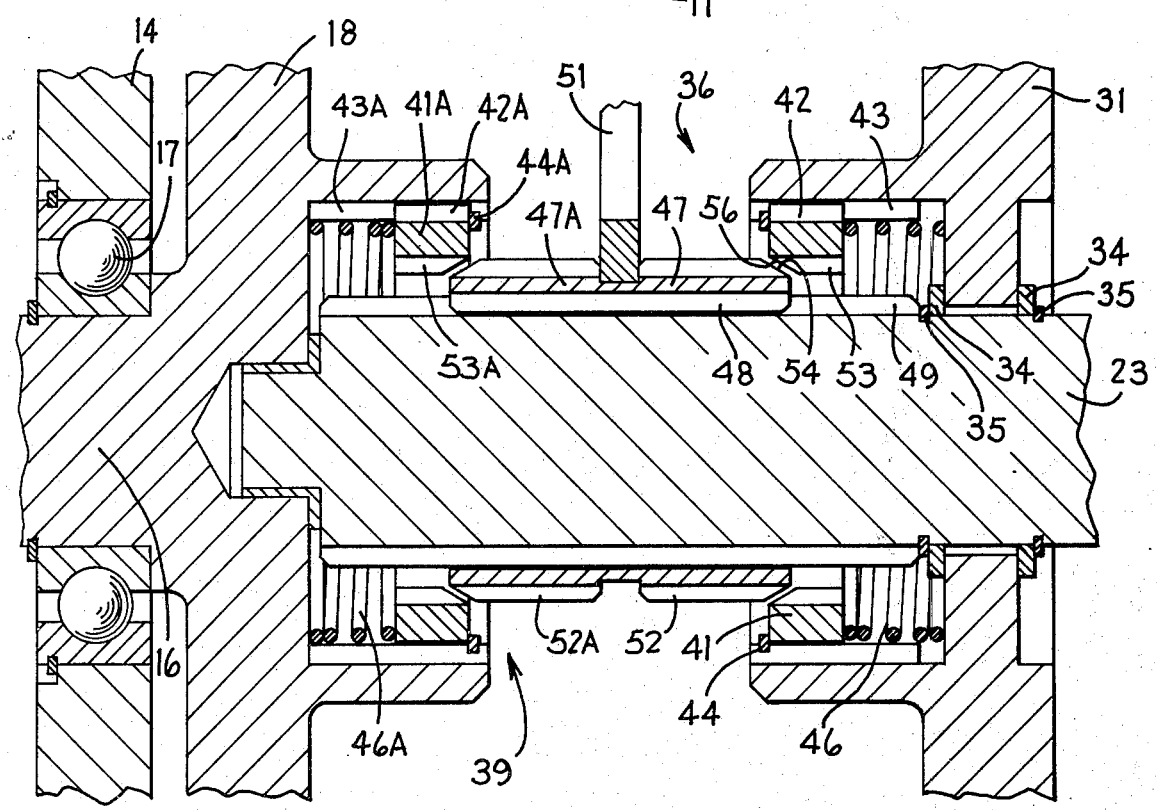

TRANSMISSION WITH SNAP SHIFT

FIELD OF THE INVENTION

This invention relates to a shiftable change speed gear device and particularly relates to a transmission, preferably a multiple countershaft transmission, having resiliently yieldable shifting mechanisms for substantially simplifying shifting of the transmission.

BACKGROUND OF THE INVENTION

In the design of transmissions, particularly heavy duty transmissions such as used on trucks, there has existed for a long time the problem of shifting the transmission through the various speed ratios, which problem is even greater when the transmission is provided with an auxiliary or range transmission section for increasing the number of speed ratios. In most know transmissions, the shifting process is either relatively difficult and/or the shifting is relatively complex. Thus, there has been a continuing effort in the design of transmissions to improve the shifting, to improve the rapidity of shifting, to reduce the complexity of the shifting mechanism and to reduce its cost. Hence, without detracting from the operability or desirability of many of the shifting mechanisms previously known, it may be stated that in the present invention these general objectives are accomplished to even a greater degree than has been previously known.

Particularly, most known transmissions have necessarily utilized synchronizers, of which many differennt types are known, for causing the speed of the jaw or toothed clutch members to be substantially synchronized prior to permitting their interengagement during a shifting sequence from one speed ratio to another speed ratio. While the use of synchronizers does not permit the shifting operation to be performed, nevertheless the use of synchronizers is, in many instances, undesirable since not only do synchronizers increase the mechanical complexity of the transmission, but they also occupy additional space so that the transmission is necessarily larger and heavier and is likewise of increased cost. The synchronizers also undergo substantial wear and thus require periodic maintenance. Accordingly, there has long existed a need for successful heavy duty transmission which can be successfully operated for long periods of time without requiring the use of conventional synchronizers and yet one which will permit successful and simple shifting thereof.

A further disadvantage of many known transmissions, including those utilizing conventional synchronizers, is the large amount of effort or force which must be exerted by the vehicle driver in order to successfully shift from one speed ratio to another. The shifting operation in such known transmissions generally requires that the operator apply a force through a shifting linkage so as to move one jaw clutch member axially into meshing engagement with another jaw clutch member. Further, the force which must be exerted by the driver to perform the shifting is often of a substantial magnitude. The necessity of exerting such effort to permit the shifting operation to be performed is obviously undesirable since under conditions of frequent shifting, such as heavy traffic or mountain driving, it may be extremely tiring for the driver.

Still another disadvantage of the shifting mechanisms of known transmissions is the length of time required for the shifting operation to be performed. Most known transmissions, due to the necessity of having synchronizers and other related structure, have necessarily provided a substantial amount of mass on the main transmission shaft. Such mass considerably increases the inertia of the transmission main shaft so that a synchronized speed condition can be rapidly acheived only by the use of large synchronizers. This results in still further size and expense.

Further, in transmissions provided with a range or auxiliary section, the above problems are even more difficult and complex. Particularly, when the auxiliary transmission is set to produce a first range of speeds, the speed of the engine must be altered to a predetermined extent to shift the main transmission section from one ratio to the next. However, when the auxiliary transmission is set to produce a second range of speeds, the engine speed must be altered a different amount in order to shift the gears in the main transmission. Thus, when it is necessary to make both a range and a main transmission shift, driving of the vehicle with many of the known transmissions has been difficult since it has required either a complex control mechanism or a conscious and physical effort by the driver to shift through the two ranges of speed.

My copending application Ser. No. 276,376, filed July 31, 1972, discloses therein a transmission having an improved resilient shifting structure, which transmission has proven highly successful in operation and has successfully overcome the abovementioned disadvantages. However, in a continuing effort to still further improve upon the above described transmission, and particularly in an effort to find other variations thereof relative to the resilient shifting mechanism which would be more suitable for use in particular environmental or structural conditions, still further variation has been made in the resilient shifting mechanism which are particularly suitable for use within the above-described transmission to facilitate the shifting thereof. The structural modifications of the present invention, and particularly as they relate to the overall transmission structure, will be described in detail hereinafter.

Accordingly, it is an object of the present invention to provide a transmission having an improved shifting structure for overcoming the above-mentioned disadvantages. Particularly, it is an object of the present invention to provide:

1. A transmission having means to improve the ease of shifting, to improve the rapidity of shifting without requiring large synchronizers, to reduce the complexity of the mechanism and to reduce its cost.

2. A transmission, as aforesaid, having a shifting mechanism which does not require the use of conventional synchronizers.

3. A transmission, as aforesaid, which utilizes resilient means for causing meshing engagement of the jaw clutch members after the desired speed synchronization has been achieved.

4. A transmission, as aforesaid, having a main shaft assembly possessing a minimum of inertia whereby to eliminate the need for synchronizers.

5. A transmission, as aforesaid, particularly having both a main transmission section and a range or auxiliary transmission section for increasing the number of speed ratios and including a single and continuous main shaft extending through both the main and range sections for minimizing the inertia and simplifying the ease and rapidity of shifting.

6. A transmission, as aforesaid, which permits shifting to occur without requiring depression of the clutch pedal and disconnection of the drive clutch, and which permits a vehicle, such as a truck, to be easily driven and shifted even by an inexperienced driver.

Other objects and purposes of the invention will be apparent to persons acquainted with devices of this type upon reading the following specification and inspecting the accompanying drawings.

BRIEF DESCRIPTION OF THE DRAWINGS

FIG. 1 is a diagrammatic view of a transmission construction according to the present invention.

FIG. 2 is an enlarged, fragmentary sectional view of the resilient clutch structure incorporated in the transmission illustrated in FIG. 1.

Figure 3:
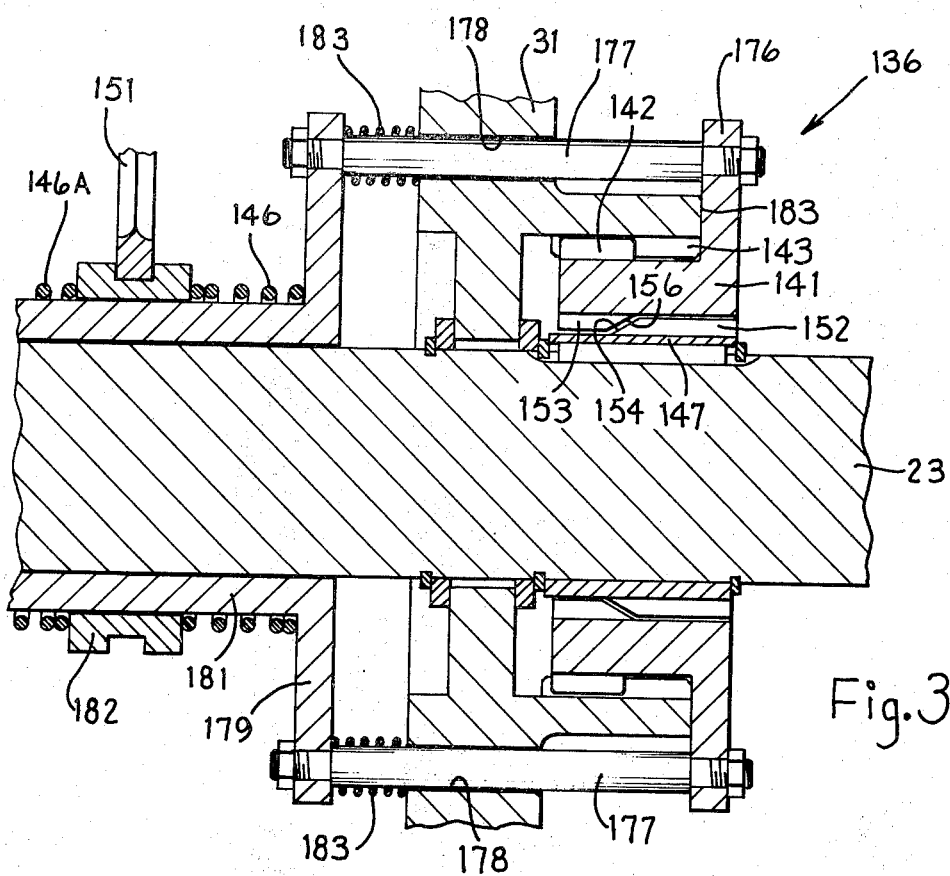
FIG. 3 is a view similar to FIG. 2 and illustrating therein a modification of the resilient clutch structure.

Certain terminology will be used in the following description for convenience in reference only and will not be limiting. The words "upwardly," "downwardly," "rightwardly" and "leftwardly" will designate directions in the drawings to which reference is made. The words "forward" and "rearward" will refer respectively to the front and rear ends of the transmission as same is conventionally mounted in the vehicle, being respectively the left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

The objects and purposes of the present invention are met by providing a transmission having yieldable shifting mechanisms together with cooperating arrangements which do not only improve the ease and rapidity of shifting, but also substantially simplify the transmission structure and minimize the rotational inertia. The transmission preferably includes a plurality of countershafts each having an identical set of countershaft gears thereon. Main shaft gears encircle the transmission main shaft and are in continuous meshing engagement with corresponding pairs of countershaft gears. A yieldable shifting mechanism coacts with each main shaft gear for causing same to be clutchingly engaged with the main shaft for rotation therewith. The yieldable shifting mechanism includes first and second annular jaw clutch members surrounding the main shaft, the first jaw clutch member being nonrotatably coupled to a respective main shaft gear and the second jaw clutch member being nonrotatably coupled to the main shaft. The first jaw clutch member is axially shiftable relative to both its respective main shaft gear and the main shaft. The shifting mechanism includes resilient means coacting with the jaw clutch members. When the cooperating jaw clutch members are relatively axially moved toward one another to effect clutch engagement, the resilient means permits engagement to be delayed until after the desired synchronized speed condition has been achieved. The meeting faces of the jaw clutch members are preferably provided with cooperating conical surfaces which permit the clutch members to bear against one another and prevent engagement during non-synchronous conditions, with the resilient means then causing relative axial displacement between the clutch members to cause engagement thereof when the desired speed synchronization is reached.

DETAILED DESCRIPTION

Referring to the drawings, there is illustrated a transmission 11 having both a main transmission section 12 and a range or auxiliary transmission section 13, each of which has a plurality of selectable ratios. The main and range sections are both suitably enclosed by a conventional housing 14.

The transmission 11 specifically includes an input shaft 16 supported adjacent its rearward end by a bearing 17 and provided with an input gear 18 nonrotatably connected thereto, as by splines. The input gear 18 simultaneously drives a plurality of countershafts at equal speeds. In the illustrated embodiment, the transmission is provided with two parallel countershafts 21 and 22 disposed on diametrically opposite sides of the main shaft 23, which main shaft is coaxially aligned with the input shaft 16 and is provided with a pilot portion on its forward end rotatably received within and supported by the rearward end of the input shaft.

Each of the countershafts 21 and 22 is provided with an identical grouping of countershaft gears 26, 27, 28 and 29 thereon, which groupings form pairs of gears, such as the pair of gears 27, of identical size and number of teeth and disposed on diametrically opposite sides of the main shaft 23.

A plurality of main shaft drive gears 31, 32 and 33 encircle the main shaft 23 and are selectively clutchable thereto one at a time by yieldable clutch mechanisms 36, 37 and 38 respectively, as described in greater detail hereinafter. A further yieldable clutch mechanism is associated with the input gear 18 for selectively clutching same to the main shaft 23.

The main shaft gears 31 annd 32 encircle the shaft 23 and are in continuous meshing engagement with the diametrically opposed pairs of countershaft gears 27 and 28 respectively. The main shaft gear 33 is the reverse gear and is in continuous meshing engagement with the pair of countershaft gears 29 by means of conventional intermediate gears (not shown). The remaining or forwardmost pair of countershaft gears 26 are continually meshed with and driven by the input gear 18 for causing simultaneous rotation of the countershafts 21 and 22 whenever the input shaft 16 is rotatably driven.

Each of the main shaft gears 31, 32 and 33 is axially immovable to the main shaft 23 and is rotatable realtive thereto when the respective yieldable clutch mechanism is disengaged. Any suitable structure may be utilized for axially restraining the individual main gears with respect to the main shaft. For example, as illustrated in FIG. 2, the main shaft gear 31 is axially restrained between a pair of thrust rings 34, which rings in turn are axially fixed relative to the main shaft 23 by snap rings 35. The main shaft gears 31, 32 and 33 are radially floatably supported relative to the main shaft 23 by the diametrically opposed pairs of cooperating countershaft gears, which mounting means and the special advantages therefrom are explained in detail in U.S. Pat. Nos. 3,105,395 and 3,335,616.

While the present invention preferably positions the main shaft gears for radially floating movement with respect to the main shaft, it will be appreciated that the required floating movement can also be provided at some of the locations within the transmission if desired. For example, the floating movement could be provided by either mounting the main shaft for radial floating movement or, in the alternative, mounting the countershafts for radial floating movement. In these latter situations, the main shaft gears could then be mounted directly on the main shaft, such as by having conventional antifriction bearings interposed therebetween.

Referring now to FIG. 2, the yieldable clutch structure 36 associated with the main shaft gear 31 includes an annular clutch collar 41 mounted on the gear 31. The clutch collar 41 is provided with external splines 42 which are disposed within corresponding internal splines 43 provided on the gear 31 for interconnecting the clutch collar 41 to the gear 31 for rotation therewith. However, the cooperating splines 42 and 43 permit the clutch collar 41 to freely slide axially relative to the gear 31. A stop ring 44 is seated within a suitable groove formed on the internal periphery of the splines 43 and is disposed for contacting the clutch collar 41 and limiting the axial movement thereof. The collar 41 is normally resiliently urged by means of a spring 46 into abutting engagement with the stop ring 44.

The clutch structure 36 is provided with a further annular clutch collar 47 encircling the main shaft 23, which clutch collar 47 has internal splines 48 which are disposed within corresponding external splines 49 provided on the main shaft 23 for nonrotatably interconnecting the clutch collar 47 to the main shaft 23 while permitting the clutch collar 47 to freely slide axially relative to the shaft. For this purpose, the clutch collar 47 is connected to a conventional shift fork 51 which is controlled in a conventional manner. The clutch collar 47 is provided with external teeth or splines 52 which are adapted to meshingly engage internal teeth 53 formed on the clutch collar 41. The teeth 52 of the clutch collar 47 are tapered, as at 54, and in a similar manner the leading edge of the teeth 53 are similarly tapered as at 56. The confronting tapered conical surfaces 54 and 56 each extend at an angle of preferably between 30 and 40 percent relative to the longitudinal axis of the main shaft 23. The exact degree of taper, and the advantages thereof, are explained in U.S. Pat. No. 3,265,173.

The resilient and shiftable clutch structure 39 is, as illustrated in FIG. 2, substantially identical to the clutch structure 36 and is disposed opposite same so as to permit selective clutching engagement between the input gear 18 and the main shaft 23. Since the individual components of the clutch structure 39 are substantially identical to the components of the clutch structure 36, they have been designated by the same reference numerals but with an A added thereto.

In the illustrated embodiment the clutch collars 47 and 47A are fixedly, here integrally, connected so as to effectively comprise a single shiftable collar which is controlled by the shift fork 51. The clutch collars 41 and 41A are axially spaced apart by a sufficient distance so that the clutch collars 47 and 47A can be positioned within a central position which results is disengagement of both clutch structures 36 and 39, as illustrated in FIG. 2.

With respect to the resilient shiftable clutch structures 37 and 38, they are substantially identical to the clutch structure 36. In fact, the clutch structures 37 and 38 coact with their respective main shaft gears 32 and 33 in substantially the same manner as illustrated in FIG. 2 with respect to the clutch structures 39 and 36, respectively. Thus, the individual components of the clutch structures 37 and 38 have been identified by the same reference numerals used to identify the components of the clutch structures 39 and 36, respectively, except for the addition of a prime (') thereto.

Considering now the range section 13, same includes a plurality of countershafts 61 and 62 each having an identical grouping of countershaft gears 63 and 64 thereon. The first pair of countershaft gears 63 are disposed diametrically opposite and in continuous meshing engagement with a main shaft gear 66, which gear 66 is preferably radially supported relative to the main shaft 23 by the gears 63. In a similar manner, the other pair of countershaft gears 64 are disposed diametrically opposite and in continuous meshing engagement with a further main shaft gear 67, which gear 67 is also preferably supported for radial floating movement relative to the axis of the main shaft 23 by the countershaft gears 64. The main shaft gears 66 and 67 are both axially fixed relative to the main shaft 23, with the gear 66 being axially fixed by means of thrust washers 34 similar to those illustrated in FIG. 2. The other main shaft gear 67 is nonrotatably connected to the forward end of an output shaft 69, such as by being splined thereto, which splined connection permits radial floating movement of the gear 67. The main shaft 23 extends substantially continuously through not only the main transmission section 12, but also through the range transmission section 13. The rearward end of the main shaft 23 is provided with a conventional pilot portion of the end thereof which is rotatably received and supported within the end of the output shaft 69.

The range section gears 66 and 67 are each individually clutchably engagable with the main shaft 23 by means of resilient clutch structures 71 and 72, which clutch structures are each identical to the clutch structure 36 described above. In fact, the clutch structures 71 and 72 coact between the main shaft gears and the main shaft in the same manner as illustrated in FIG. 2 relative to the clutch structures 39 and 36, and further description of the clutch structures 71 and 72 is thus not believed necessary. However, for convenience in reference and identification, the components associated with the clutch structures 71 and 72 have been identified by the same reference numerals used to identify the corresponding parts of the clutch structures 39 and 36, respectively, but with the addition of a double prime ('') added thereto.

OPERATION

The operation of the transmission according to the present invention will be briefly described to insure a complete understanding thereof.

Assuming first that both the main section 12 and the range section 13 are in low gear, then the main shaft gear 32 will be clutchably engaged with the main shaft 23 by means of the intermediate clutch collars 41A' and 47A', and the range shaft gear 66 will be clutchably engaged to the main shaft 23 by means of the clutch collars 41A'' and 47A''. The remaining gears which are concentric with the main shaft, namely the gears 18, 31, 33 and 67, will thus be directly clutched to the main shaft 23 when the transmission is in this operation condition. When in low gear, power will thus be transmitted from input shaft 16 to input gear 18 and through the pair of countershaft gears 26 so as to cause identical rotation of the countershafts 21 and 22. Rotation of the countershafts causes a corresponding rotation of the pair of countershaft gears 28, which in turn causes rotation of main shaft gear 32, which then drives main shaft 23. Main shaft 23 drives the main shaft gear 66 which transmits torque through the countershaft gears 63 and 64 to the further main shaft gear 67, which is drivingly connected directly to the output shaft 69 for causing rotation thereof.

After the vehicle has been put into motion and it is desired to shift into second gear, the driver moves the shift lever (not shown) which, through a conventional shifting linkage, moves the shift fork 51' rearwardly (rightwardly in FIG. 1) to disengage the clutch collar 47A' from the clutch collar 41A', thereby disengaging the gear 32 from the main shaft 23. The main transmission section 12 is now in neutral. The shifting movement is continued to cause a rearward shifting of the shift fork 51 and the clutch collar pair 47–47A associated therewith, whereupon the tapered face 54 on the clutch collar 47 contacts the tapered surface 56 on the clutch collar 41. However, since the gear 31 and clutch collar 41 are rotating faster than the collar 47 (which is rotating with the shaft 23), the collars 41 and 47 do not meshingly engage and thus the collar 41 moves axially (rightwardly in FIGS. 1 and 2) in opposition to the resilient urging of the spring 46. To synchronize the speed of the collars 41 and 47, the vehicle operator releases the vehicle throttle or accelerator (supplemented if desired for still faster operation by a conventional countershaft brake) so as to decrease the speed of the input shaft 16, whereupon the gear 31 and collar 41 slows down to approach the speed of the collar 47. When the desired synchronization between the collars 41 and 47 is achieved, the spring 46 then causes the collar 41 to move forwardly (leftwardly in FIGS. 1 and 2) to automatically meshingly engage the collar 47 and thereby drivingly couple gear 31 to the main shaft 23.

When it is desired to shift into the third speed ratio, the shift fork 51 and the clutch collar pair 47–47A are moved leftwardly which causes the clutch collar 47 to disengage the clutch collar 41 and then causes the clutch collar 47A to contact the clutch collar 41A associated with the input gear 18. Since the input gear 18 is rotating faster than the clutch collar 47A, the collar 41A is moved axially leftwardly against the urging of the spring 46A unitl the engine speed has decreased sufficiently to provide a substantially synchronized speed condition, whereupon the spring 46A causes the collar 41A to move rightwardly to meshingly engage the collar 47A, thereby drivingly connecting the input gear 18 directly to the main shaft 23.

In order to shift into a fourth speed ratio, it is necessary to perform not only a shifting of the main transmission section 12, but also a shifting of the range section 13. Thus, to shift to the fourth speed ratio, both the shift lever associated with the main section and the shift control associated with the range section are actuated. Preferably, as in U.S. Pat. No. 2,637,221, the range shift is preselected and caused to operate automatically upon the shift lever associated with the main transmission section entering its neutral position. Thus, after appropriate preselection of the range shift control as set forth in said patent, the shift lever (not shown) associated with the main transmission section is actuated to move the shift fork 51 rightwardly, thereby disengaging gear 18 from shaft 23 so that the main transmission section is again in neutral. The range control, being now actuated, causes the shift fork 51'' to be move rearwardly (rightwardly) from the position illustrated in FIG. 1 whereupon the clutch collar 47A'' disengages the clutch collar 41A'' so that the clutch collar 47''-47A'' is thus momentarily in a neutral position. The clutch collar 47''-47A'' is moved further rearwardly until the clutch collar 47'' contacts the clutch collar 41'' and causes same to move axially rightwardly in opposition to the resilient urging of the spring 46''. In this condition, the main shaft 23 is disconnected from the output shaft 69 and, since the shaft 23 has no large structure mounted thereon, it possess little inertia so that the shaft 23 rapidly slows down to acheive a speed synchronization with the output shaft 69. When this occurs, the spring 46'' causes the clutch collar 41'' to move axially leftwardly to meshingly engage the clutch collar 47'', thereby drivingly connecting the main shaft 23 directly to the output shaft 69.

Continuing movement of the main shaft mechanism towards its fourth speed ratio position causes the shift collar 51' to again move axially leftwardly so as to move the clutch collar 47A' into contact with the clutch collar 41A', which clutch collar is axially displaced and, when speed synchronization is acheived, is axially moved rightwardly by the spring 46A' so as to meshingly engage the collar 47A' and thereby drivingly coupling the gear 32 to the main shaft 23.

The sequence in shifting from the fourth to the sixth speed ratio is identical to the sequence involved in shifting from the first to the third speed ratio as described above.

Down shifting is carried out in the reverse manner to that described above, and thus further description of the shifting sequence is not believed necessary. However, it will be appreciated that during down shifting, the speed of the main shaft will be slightly greater than the speed of the main shaft gear which is to be clutchingly engaged therewith. Accordingly, during the downshifting sequence, and after one main shaft gear has been disengaged from the main shaft, the driver of the vehicle will depress the vehicle throttle or accelerator to increase the engine speed sufficiently to accelerate the main shaft gear associated with the next lower speed ratio, which will thus permit the main shaft gear associated with the next lower speed ratio to come into speed synchronization with the clutch collar on the main shaft, whereupon the associated spring will automatically cause clutch engagement to occur, thereby completing the down shift.

The resilient clutch structure of the present invention, as illustrated in FIG. 2, is highly desirable since in association with the other transmission components it results in minimizing the mass mounted on and rotatable with the main shaft, thereby minimizing the inertia of the main shaft. A further advantage of the yieldable clutch structure illustrated in FIG. 2 is that it develops an engagement force which is independent of the force imposed on the shift fork or lever. Further, the engagement force, as determined by the strength of the spring 46, can be individually designed for each speed ratio so as to provide for a minimum engagement force, thereby likewise minimizing wear. For example, the shiftable gear collar at low speed ratios may require either a larger mass or a lesser engagement force in order to control the engagement thereof with its respective main shaft collar at the desired synchronized speed. On the other hand, at the higher speed ratios, the engagement force can be increased or the mass of the shift collar can be reduced while still permitting control over engagement of the collar with its respective main shaft collar at the desired synchronized speed. The yieldable clutch structure according to the present invention is thus well suited for this type of operation since the mass of the individual shiftable clutch collars and the engagement force developed by the spring can be individually designed for each shiftable clutch assembly.

In some situations, particularly when the transmission is operated under heavy load such as to cause extreme rapid changes in relative speed between the parts being shifted, it is desirable to incorporate into the clutch structure a suitable system of blockers to insure the clutch teeth become fully engaged before load is imposed thereon. Such a blocker system is explained in detail in my copending application Ser. No. 276,376, and similar such blocking systems could be incorporated into the clutch structures of the present invention is desired.

The transmission structure of the present invention, for convenience in illustration and description, is illustrated as incorporating only three forward speed ratios within the main transmission section. However, as will be apparent to those of ordinary skill in the transmission art, the number of forward speed ratios within the main transmission section can be appropriately increased as desired merely by incorporating into the transmission additional cooperating sets of main and countershaft gears in substantially the same manner as illustrated in FIG. 1. Thus, the transmission of the present invention, and particularly the improved clutch structure associated therewith, is equally applicable to a transmission having any desired number of speeds in either the main or range sections.

MODIFICATIONS

FIG. 3 illustrates therein a modification of the present invention, and particularly a modification of the resilient shiftable clutch structure, which modification can be incorporated into the transmission which is diagrammatically illustrated in FIG. 1.

The resilient shiftable clutch structure 136 illustrated in FIG. 3 again includes an annular jaw clutch collar 141 supported by an nonrotatably connected to a main shaft gear, such as the gear 31. The jaw clutch collar 141 again includes external splines 142 formed thereon and disposed in meshing engagement with similar internal splines 143 formed on the gear 31 whereby the clutch collar 141 is nonrotatably coupled to the gear 31 while being axially slidable relative thereto. The clutch collar 141 has internal teeth 153 which are adapted to be moved into meshing engagement with external teeth 152 formed on a further jaw clutch collar 147, the latter being fixedly and immovably connected to the main shaft 23. The splines 152 and 153 have tapered confronting surfaces 154 and 156 thereon which correspond to the surfaces 54 and 56 illustrated in FIG. 2.

The clutch collar 141 has a flange portion 176 which projects outwardly therefrom and is fixedly connected to a plurality of elongated slide rods 177, which slide rods extend parallel to the main shaft 23 and slidably extend through suitable openings 178 formed in the gear 31. The opposite ends of the rods 177 are fixedly connected to a plate or flange 179 associated with a sleeve 181 which surrounds and is rotatably supported on the shaft 23. The sleeve 181 supports thereon a shift collar 182, which collar 182 is both rotatably and axially movable relative to the sleeve 181. The shift collar 182 is in turn engaged with a conventional shift fork 151. A compression spring 146 is positioned in surrounding relationship to the sleeve 181 and has one end thereof disposed in engagement with the plate 179, with the other end of the spring 146 being disposed against the shift collar 182. Still further compression springs 183 are disposed in surrounding relationship to the rods 177 and are axially confined between the plate 179 and the gear 31. The force transmitting capacity of the plurality of springs 183 is substantially less than the force transmitting capacity of the spring 146, this being achieved by providing the spring 146 with a spring rate which is several times greater than the combined spring rate of the springs 183. The spring 146 functions in the same manner as the spring 46 illustratinng in FIG. 2, in that it is utilized for causing resilient engagement of the clutch collars 141 and 147. The springs 183, on the other hand, are provided for normally maintaining the clutch collars 141 and 147 in a selected positional relationship with respect to one another wherein they are in a disengaged position. The springs 183 thus normally maintain the flange 176 in abutting engagment with the end face 183 formed on the gear 31, thereby maintaining the clutch collar 141 disengaged from the clutch collar 147 when the shift fork 151 is maintained in its disengaged position.

With respect to the operation of the clutch structure 136, same operates in substantially the same manner as the clutch structure 36 described above. That is, when engagement of the clutch is desired, the shift fork 151 is moved rightwardly. Since the spring 146 is substantially stronger than the springs 183, the rightward shifting of the shift fork 151 causes a corresponding rightward movement of the sleeve 181 as permitted by compression of the springs 183. Rightward movement of sleeve 181 causes a corresponding rightward movement of clutch collar 141 until the face 156 abuts against the face 154 formed on the clutch collar 147. Since the gear 131 and the shaft 23 will presumably not be in speed synchronization, meshing of the collars 141 and 147 is momentarily prevented, which in turn prevents further rightward movement of the collar 141 and the sleeve 181. Thus, continued rightward movement of the shift fork 151 causes the shift collar 182 to be moved rightwardly toward the flange 179, resulting in compression of the spring 146. When the desired speed synchronization between the collars 141 and 147 is achieved, then the spring 146 urges sleeve 181 and collar 141 rightly so that teeth 153 meshingly engage with teeth 152.

It will be appreciated that the clutch structure 136, as illustrated in FIG. 3, can also be used in substantially the same form for clutchably connecting the remaining main shaft gears to the main shaft. Further, the shiftable sleeve 181 can be extended axially and made to coact with a further clutch structure, such as the clutch structure associated with the input gear as illustrated in FIG. 2, which clutch structure would possess the same components associated with the clutch structure 136, including a spring 146A provided for coaction between the sleeves 181 and 182.

Figure 4:
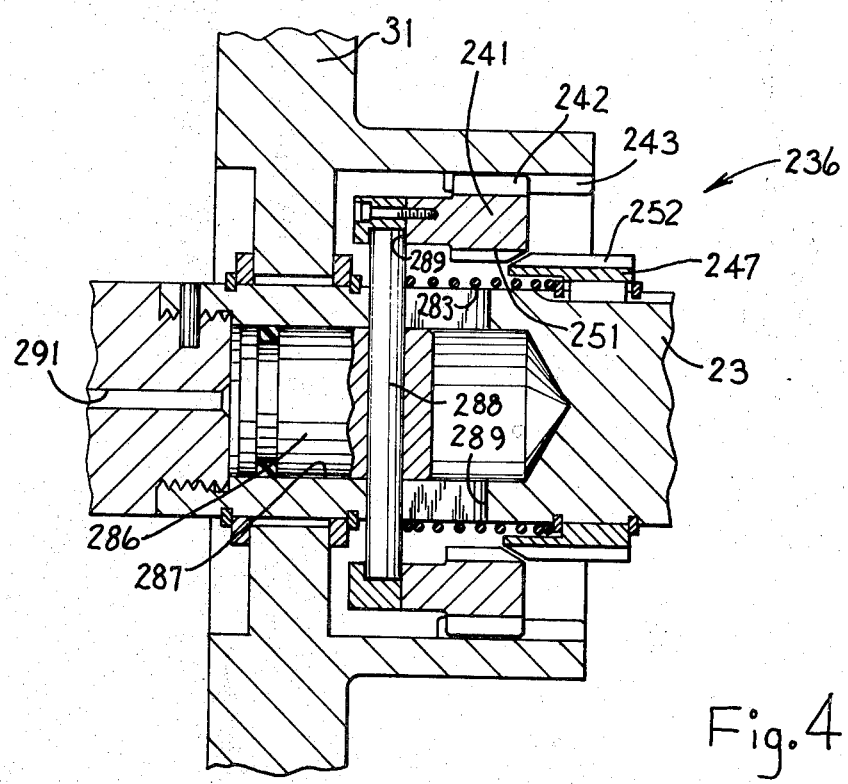
FIG. 4 is a view similar to FIG. 2 and illustrating therein a further modification of the resilient clutch structure.

FIG. 4 illustrates a further variation of the present invention wherein the resilient shiftable clutch structure 236 is positioned for permitting selective engagement between the main shaft 23 and one of the main shaft gears, such as the gear 31. The clutch structure 236 again includes an annular jaw clutch collar 241 which has external splines 242 engaged with splines 243 formed on the gear 31 so that the collar 241 is nonrotatably connected to the gear but is axially slidable relative thereto. The clutch collar 241 also has internal teeth 253 positioned for meshing engagement with teeth 252 formed on the annular jaw clutch collar 247, which collar is fixedly connected to the shaft 23. A spring 283 coacts with the collar 241 for normally maintaining same in a disengaged position.

The clutch structure 236 is actuated by means of a fluid system which, as illustrated in FIG. 4, includes a piston 286 slidably connected within a chamber 287 which is formed coaxially of the shaft 23, which shaft 23 is formed from a plurality of shaft sections so as to permit formation of the chamber 287. The piston has a pin 288 fixed thereto and extending outwardly through suitable slots 289 formed in the shaft, whereby the outer ends of the pin 288 extend into an annular slot 289 formed in the clutch collar 241. The spring 283 acts against the pin 288 to normally maintain the collar 241 and the piston 286 in the retracted positions illustrated in FIG. 4. However, the supply of pressure fluid through the passage 291 to the chamber 287 causes the piston 286 to move rightwardly, which in turn causes the collar 241 to move rightwardly in opposition to the urging of the spring 283. This rightward movement of the collar 241 continues until the tapered front face thereon engages the tapered front face formed on the collar 247. The resiliency of the pressure fluid supplied to the chamber 287 maintains the collar 241 in bearing engagement with the collar 247 until substantial speed synchronization is achieved, whereupon the pressure fluid then further moves the piston 286 rightwardly so that the collar 241 meshingly engages the collar 247. This thus results in the gear 31 being clutchingly engaged to and rotatable with the main shaft 23. The pressure fluid which is applied to the piston 286 thus functions in the same manner as the springs 46 and 146 in the previously described embodiments so as to result in resilient engagement of the clutch collars when the desired speed synchronization is achieved.

Although a particular preferred embodiment of the invention has been disclosed in detail for illustrative purposes, it will be recognized that variations or modifications of the disclosed apparatus, including rearrangement of parts, lie within the scope of the present invention.

The embodiments of the invention in which an exclusive property or privilege is claimed are defined as follows:

1. A change speed gear device, comprising:
first and second substantially parallel shaft members;
gear means drivingly connectible between said shaft members for providing a plurality of alternately selectable speed ratios, said gear means including a first rotatable gear member supported on said first shaft member and a second rotatable gear member substantially concentric with said second shaft member and meshable with said first gear member, said second gear member being axially fixed relative to said second shaft member;
clutch means for selectively drivingly connecting said second gear member to said second shaft member, said clutch means including a first annular jaw clutch member nonrotatably connected to said second gear member for rotation therewith and a second annular jaw clutch member nonrotatably associated with said second shaft member for rotation therewith, said first jaw clutch member also being mounted for axial movement relative to said first gear member;
first means coacting with said first jaw clutch member for resiliently urging said first jaw clutch member in an axial direction toward said second jaw clutch member for causing resiliently urged meshing engagement of said jaw clutch member in response to relative axial shifting movement of said first and second jaw clutch members toward one another; and
second means coacting with said first jaw clutch member and acting in opposition to the urging of said first means for normally maintaining said first jaw clutch member in a selected axial position relative to said second gear member when said jaw clutch members are disengaged, relative axial movement of said first and second jaw clutch members toward one another causing said first and second jaw clutch member to contact one another whereby said first means causes said jaw clutch members to meshingly engage when substantial speed synchronization is achieved therebetween.

2. A device according to claim 1, wherein said first means comprises spring means coacting with said first jaw clutch member for normally resiliently urging same axially in a direction towards said second jaw clutch member, and said second jaw clutch member being slidably mounted with respect to said second shaft members for relative axial movement therebetween.

3. A device according to claim 2, further including shifting means coupled to said second jaw clutch member for shifting same axially relative to said second shaft member in a direction towards said first jaw clutch member to permit meshing engagement of said first and second jaw clutching members.

4. A device according to claim 3, wherein said second means comprises stop means fixed to said second gear member, and said spring means normally urging said first jaw clutch member into engagement with said stop means.

5. A device according to claim 1, wherein said first means comprises spring means coacting with said first jaw clutch member for normally urging same axially of said second shaft member in a direction towards said second jaw clutch member, and said second jaw clutch member being axially fixed relative to said second shaft member.

6. A device according to claim 5, further including shifting means operatively connected to said first jaw clutch member for shifting same axially relative to said second shaft member between a first position wherein said jaw clutch members are spaced from one another and a second position wherein said jaw clutch members are adapted for engagement with one another, and said spring means coacting between said first jaw clutch member and said shifting means for transmitting a shifting force therethrough when said shifting means move said first jaw clutch member from said first position toward said second position.

7. A device according to claim 6, wherein said second means includes second spring means coacting with said first jaw clutch member and acting in opposition to the urging of said first-mentioned spring means for normally maintaining said first jaw clutch member in said first position, said second spring means being substantially weaker than said first-mentioned spring means.

8. A device according to claim 7, wherein said first and second jaw clutch members are positioned axially on one side of said second gear member, a clutch control member positioned axially adjacent the other side of said second gear member and mounted for axial sliding movement relative to said second shaft member, a connecting member axially slidably supported on said second gear member and extending therethrough, said connecting member being fixedly connected adjacent opposite ends thereof to said first jaw clutch member and said clutch control member, and said first-mentioned spring means coacting between said shifting means and said clutch control member.

9. A device according to claim 1, wherein said first means includes fluid pressure means for urging said first jaw clutch member in a direction axially towards said second clutch member, and said second jaw clutch member being axially fixed relative to said second shaft member.

10. A device according to claim 9, wherein said second means includes spring means with said first jaw clutch member for normally resiliently urging same in opposition to the urging of said fluid pressure means for maintaining said first jaw clutch member in a disengaged position.

11. A device according to claim 10, wherein said fluid pressure means includes an elongated chamber formed within said second shaft member and piston means slidably disposed within said chamber for movement in a direction substantially parallel to the axial direction of said second shaft member, passageway means communicating with said chamber for supplying pressure fluid thereto to move said piston means axially of said second shaft member, and means interconnected between said piston means and said first jaw clutch member for moving said first jaw clutch member axially towards said second jaw clutch member in response to pressurization of said chamber by said pressure fluid.

12. A device according to claim 1, wherein said second gear member has an annular recess formed therein in surrounding relationship to said second shaft member, said recess having the outer periphery thereof defined by axially extending splines, and said first jaw clutch member having axially extending splines formed on the outer periphery thereof and disposed in meshing and sliding engagement with the splines formed on said second gear member, said first jaw clutch member also having an annular set of teeth fixedly associated therewith and adapted for meshing engagement with a further set of annular teeth formed on said second jaw clutch member.

13. In a transmission, the combination comprising:
a housing;
a plurality of spaced and substantially parallel countershafts mounted within said housing;
a plurality of countershafts ratio gears mounted on each of said countershafts, the individual ratio gears on one countershaft being grouped with and radially spaced from identical ratio gears on the other countershafts for defining countershaft gear groups;
a main shaft member disposed between and substantially parallel with said plurality of countershafts;
a plurality of main ratio gear members disposed substantially concentrically on said main shaft member, each of said main ratio gear members being disposed in continuous meshing engagement with and radially floatably supported by a respective one of said countershaft gear groups;
releasable clutch means associated with one of said main ratio gear members for selectively nonrotatably interconnecting same to said main shaft member, said clutch means including first and second annular jaw clutch members nonrotatably associated with said one main gear member and said main shaft member, respectively, at least one of said jaw clutch members being axially slidably mounted on its respective member;
first means coacting with said clutch means for axially urging said first and second jaw clutch members relatively toward one another for creating a resilient engaging force to cause said clutch members to meshingly engage when the speed of said jaw clutch members is substantially synchronized; and
second means coacting with said clutch means for normally maintaining said first and second jaw clutch members in an axially spaced relationship when said clutch means is disengaged.

14. A transmission according to claim 13, wherein said first jaw clutch member is axially slidably relative to said one main gear member.

15. A transmission according to claim 14, wherein said first means comprising spring means coacting with said first jaw clutch member, at least when said clutch means is moved into an engaging position, for resiliently urging said first jaw clutch member axially into engagement with said second jaw clutch member to cause meshing therebetween when substantial speed synchronization if achieved between said first and second jaw clutch members.

16. A transmission according to claim 15, wherein said second jaw clutch member is axially slidably mounted on said main shaft member.

17. A transmission according to claim 15, wherein said second means comprises second spring means coacting with said first jaw clutch member for normally urging same axially of its respective gear member in opposition to the urging of said first-mentioned spring means, said second spring means being substantially weaker than said first-mentioned spring means, and shifting means interconnected to said first jaw clutch member for causing axial shifting thereof in said axial direction and in opposition to the urging of said second spring means for causing same to be moved axially into engagement with said second jaw clutch member.

18. A transmission according to claim 17, wherein said second jaw clutch member is axially fixed relative to said main shaft member.

19. A transmission according to claim 14, wherein said second jaw clutch member is axially relative to said main shaft member, and wherein said second means comprises spring means for normally maintaining said first jaw clutch member axially spaced and disengaged from said second jaw clutch member.

20. A transmission according to claim 19, wherein said first means includes fluid pressure means interconnected to said first jaw clutch member for moving same axially into engagement with said second jaw clutch member.

21. A change speed gear device, comprising:

first and second substantially parallel shaft members;

gear means drivingly connectable between said shaft members for providing a plurality of alternately selectable speed ratios, said gear means including a first rotatable gear member supported on said first shaft member and a second rotatable gear member substantially concentric with said second shaft member and meshable with said first gear member, said second gear member being axially fixed relative to said second shaft member;

clutch means for selectively drivingly connecting said second gear member to said second shaft member, said clutch means including a first annular jaw clutch member nonrotatably connected to said second gear member for rotation therewith and a second annular jaw clutch member nonrotatably associated with said second shaft member for rotation therewith, said first jaw and clutch member also being mounted for axial movement relative to said first gear member, and first means coacting with said first jaw clutch member for resiliently urging said first jaw clutch member in an axial direction toward said second jaw clutch member for causing resiliently urged meshing engagement of said jaw clutch member in response to relative axial shifting movement of said first and second jaw clutch members toward one another, relative axial movement of said first and second jaw clutch members toward one another causing said first and second jaw clutch member to contact one another whereby said first means causes said jaw clutch members to meshingly engage when substantial speed synchronization is achieved therebetween.

* * * * *

UNITED STATES PATENT AND TRADEMARK OFFICE
CERTIFICATE OF CORRECTION

PATENT NO. : 3,910,131
DATED : October 7, 1975
INVENTOR(S) : Elmer A. Richards

It is certified that error appears in the above-identified patent and that said Letters Patent are hereby corrected as shown below:

| | |
|---|---|
| Col. 1, line 17: | The word "know" should read "known". |
| line 35: | Delete the word "not" after does. |
| Col. 3, line 42: | Delete the word "do". |
| Col. 5, line 65: | "is" should read "in". |
| Col. 7, line 52: | "unitl" should read "until". |
| Col. 8, line 18: | "posses" should read "possesses". |
| Col. 9, line 17: | "extreme" should read "extremely". |
| Col. 11, line 20: | "connected" should read "disposed". |
| line 45: | "applied" should read "supplied". |
| Col. 13, line 28: | Insert the word "jaw" before the word "clutch", first occurrence. |
| Col. 14, line 45: | "if" should read "is". |

Signed and Sealed this second Day of March 1976

[SEAL]

Attest:

RUTH C. MASON
*Attesting Officer*

C. MARSHALL DANN
*Commissioner of Patents and Trademarks*